July 8, 1969 L. A. FRIEDMAN, JR 3,454,027
PROPORTIONAL DISPENSING FLUID HANDLING SYSTEM
Filed Jan. 26, 1966 Sheet 1 of 2
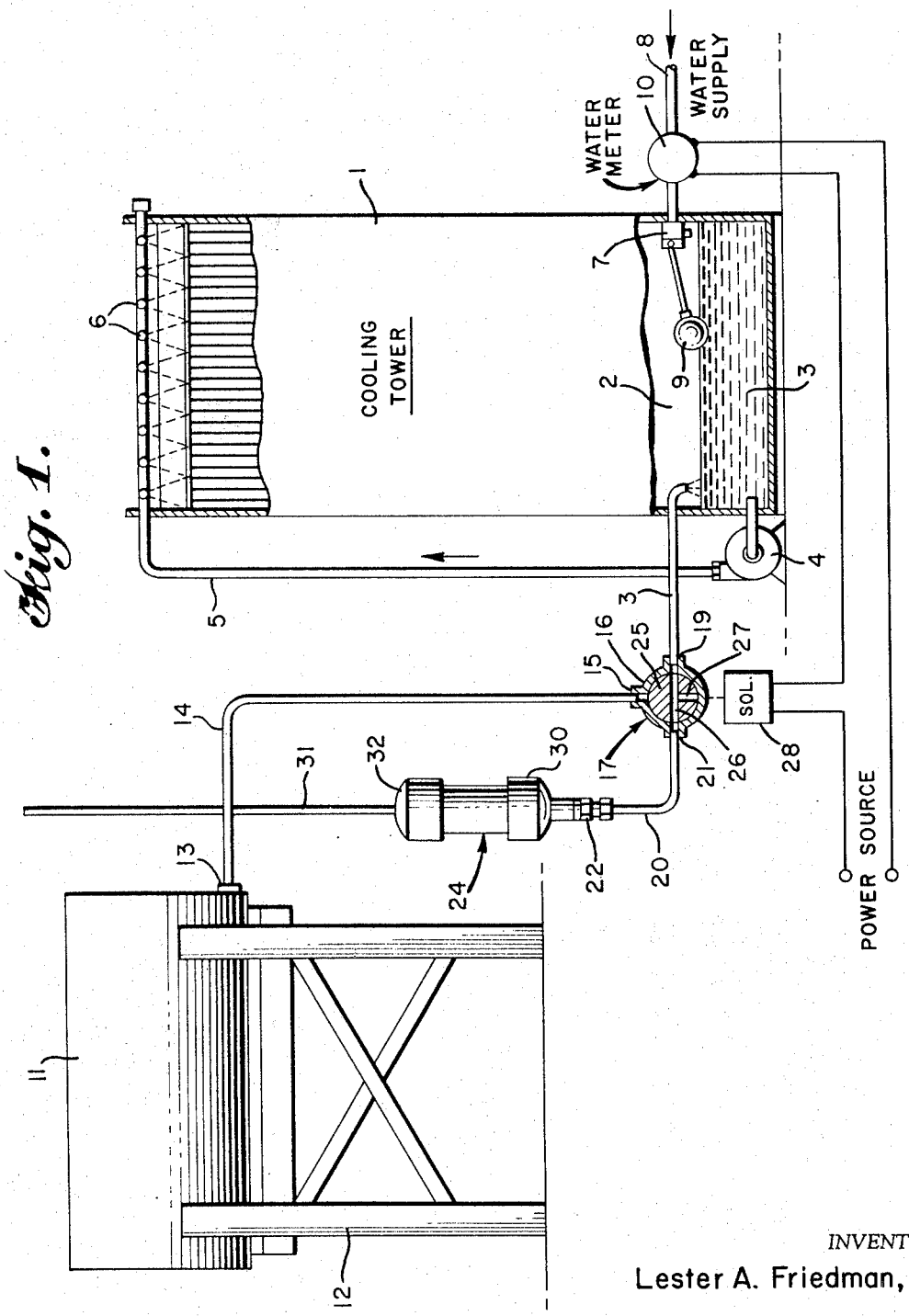
INVENTOR
Lester A. Friedman, Jr.
BY Browne, Schuyler & Beveridge
ATTORNEYS

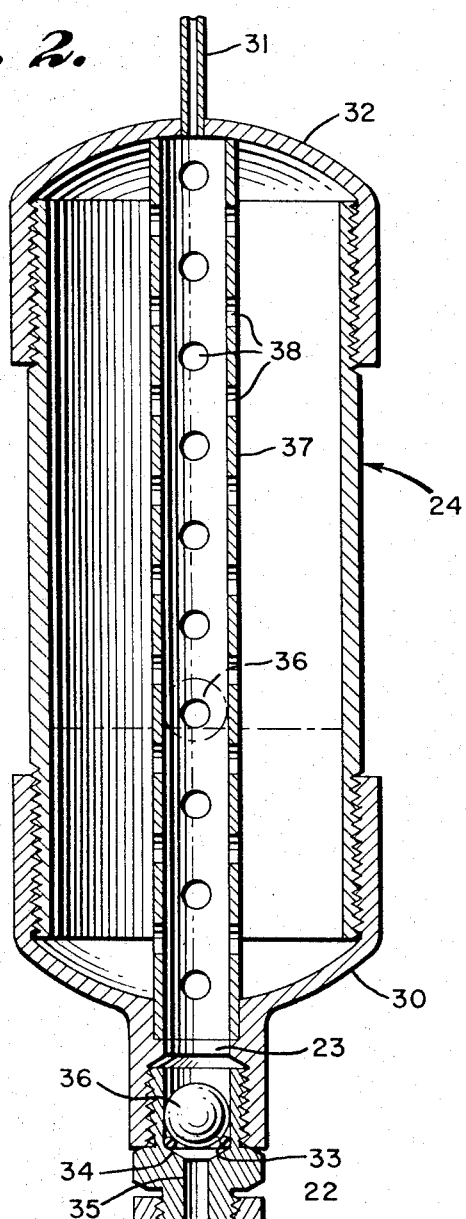
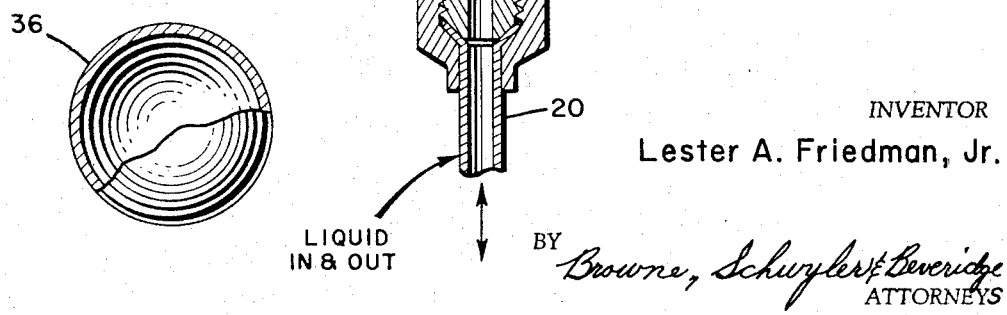

United States Patent Office 3,454,027
Patented July 8, 1969

3,454,027
PROPORTIONAL DISPENSING FLUID HANDLING SYSTEM
Lester A. Friedman, Jr., 435 King Road, NW., Atlanta, Ga. 30305
Filed Jan. 26, 1966, Ser. No. 523,059
Int. Cl. G05d 11/13; F16k 31/18; G01f 11/28
U.S. Cl. 137—101.21
6 Claims

ABSTRACT OF THE DISCLOSURE

This invention is for an apparatus for dispensing a plurality of fluids in proportional quantities, and includes a flow meter for accurately measuring the quantity of one fluid which is dispensed and for controlling the actuation of a valve which, in turn, controls the flow of a second fluid into and out of a fixed volume metering tank.

---

This invention relates to fluid handling systems, and more particularly to an improved fluid handling system for dispensing a plurality of fluids in proportional quantities.

In the operation of numerous fluid handling systems, it is frequently desirable to dispense or feed a plurality of fluids in proportional quantities. For example, in the operation of a water cooled heat exchanging system, such as that commonly employed in a commercial air conditioning system, it is necessary to employ cooling water which has been chemically treated to reduce corrosion in the system and the reduce or prevent the formation of scale on the heat exchanger coils. In such systems, it is usually necessary to add fresh water (referred to herein as makeup water), either continuously or at frequent intervals, to replace water lost through evaporation, spillage, leakage or the like. In order to maintain the desired concentration of treating chemicals in the system, it is necessary to periodically add a quantity of the various treating chemicals to the system, which quantity is directly proportional to the quantity of makeup water which has been added to the system.

Although numerous devices have been developed for feeding a plurality of fluids in proportional quantities, with the quantity of one fluid controlling the feeding of the remaining fluids, the devices have not been entirely satisfactory in that they have generally been relatively complex and have not been sufficiently accurate or reliable for unattended use over prolonged periods. Accordingly, it is the primary object of this invention to provide a fluid handling system which will automatically, accurately and reliably dispense a quantity of a fluid material in direct proportion to the quantity of another fluid material dispensed by the system.

An important feature of this invention resides in providing a flow meter which accurately measures the quantity of one fluid which is dispensed. The meter is employed to control actuation of a valve which regulates the flow of a second fluid into and out of a fixed volume metering tank. The valve is normally in position to permit the second fluid to flow from a suitable supply source into the metering tank to fill the tank. When a predetermined quantity of the first fluid is dispensed, as measured by the meter, the valve is positioned to block flow of the second fluid into the metering tank, and to permit the second fluid in the metering tank to drain therefrom by gravity.

Other objects and advantages of the invention will become apparent from the following description read in conjunction with the attached drawings in which:

FIG. 1 is a schematic drawing illustrating the invention employed in an air conditioning cooling water system;

FIG. 2 is a sectional view taken on line 2—2 of FIG. 1; and

FIG. 3 is a fragmentary view of the ball float illustrated in FIG. 2.

Referring now to the drawings in detail, the reference numeral 1 illustrates the cooling tower of a commercial air conditioning system. The cooling tower includes a tank, or reservoir, 2 at its base, with the reservoir containing a supply of cooling water 3. The cooling water 3 is drawn from the reservoir by a suitable pump 4 and circulated through the system illustrated schematically by pipe 5, then discharged at the top of the tower through nozzles 6 and permitted to flow downwardly through the tower 1 and return to the reservoir 2 in the conventional manner.

Since considerable water is lost through evaporation in the cooling tower, and from leakage in the system, it is necessary to periodically add makeup water to the reservoir 2. To maintain the water at the desired level in the reservoir, a float valve 7 is mounted on an inlet conduit 8 and carries a ball float 9 which follows the liquid level in the reservoir 2 to open or close valve 7. Inlet conduit 8 is connected to a suitable source of fresh water, not shown, and a flow meter 10 is connected in conduit 8 to accurately measure the quantity of fresh water flowing into the reservoir 2 through valve 7.

A tank, or reservoir 11, containing a supply of fluid water-treating chemical to be added to the water in the reservoir 2, is supported by a suitable frame 12 at a level substantially above the maximum level of the water 3 to thereby permit the chemical treating fluid to flow from tank 11 to the reservoir 3 by gravity. Tank 11 has an outlet 13 adjacent the bottom thereof, and a pipe 14 has one end connected to outlet 13 and the other end connected to an inlet port 15 in the housing 16 of a two-way rotary valve 17. A discharge pipe 18 has one end connected to a second port 19 of valve 17, and extends into reservoir 2 to terminate at a point spaced above the maximum level of cooling water 3. A third pipe 20 has one end connected to a third port 21 in valve 17, and its other end connected to a ball float check valve 22 mounted in an opening 23 in the bottom of a metering tank 24. Tank 24 is positioned at a level intermediate the level of valve 17 and opening 13 so that, depending upon the position of valve 17 as more fully herein below described, treating fluid may flow by gravity from supply tank 11 through pipes 14 and 20 into the metering tank 24, or alternatively from tank 24 through pipes 20 and 18 into reservoir 2.

Valve 17 includes a rotary valve element 25 having drilled passages 26 and 27 therein. A solenoid, illustrated schematically at 28, is provided to rotate valve element 25 between the dispensing position illustrated in FIG. 1 in which passages 26 is aligned with ports 19 and 21 to establish fluid communication between pipes 18 and 20, and a filling position in which passage 26 is aligned with port 15 and passage 27 is aligned with port 21, thereby establishing fluid communication between pipe 14 and pipe 20 and interrupting the fluid communication between pipes 18 and 20. Thus, it is seen that when valve element 25 is in the dispensing position to permit fluid to flow from metering tank 24, no fluid can flow from supply tank 11 and, similarly, when valve element 25 is in the filling position, fluid can flow by gravity from tank 11 to metering tank 24, but no flow is permitted through pipe 18 to reservoir 2.

Referring to FIG. 2 of the drawings, it is seen that metering tank 24 is a closed, fixed volume tank having a common inlet and outlet opening 23 in the bottom wall 30 thereof. A small diameter vent tube 31 is mounted in and extends through the top wall 32 of tank 24 and extends upwardly therefrom to a point above the level of supply tank 11 to vent the interior of tank 24 to atmosphere. By extending tube 31 above tank 11, overflow of tank 24 is prevented.

The ball float valve 22 is provided in inlet-opening 23 to seal the outlet and thereby prevent air from entering conduit 20 when all the fluid has been drained from metering tank 24. Valve 22 includes a resilient O-ring 33 supported adjacent a shoulder 34 in valve body 35 in position to engage and form a fluid-tight seal with a hollow ball float 36 floating on the surface of the fluid within tank 24. Ball float 36 is guided into engagement with resilient O-ring 33 by a tubular guide 37 extending between bottom wall 30 and top wall 32. Guide 37 is provided with a plurality of openings 38 spaced along its entire length to permit the flow of fluid into and out of the interior of tank 24.

As fluid enters tank 24, through valve 22 in openings 23, ball float 36 will be guided upwardly through guide 37 and, as the tank 24 is filled, ball float 36 will be buoyed upward by the fluid to engage and close the bottom end of vent tube 31.

Meter 10 includes a set of normally open electrical contacts, not shown, connected in the power supply to solenoid 28 so that the solenoid is normally de-energized. In the de-energized condition, solenoid 28 is resiliently based in a direction to retain valve 17 in the filling position. Meter 10 also includes a rotary cam actuator for momentarily closing the electrical contacts each time a predetermined quantity of water is discharged into reservoir 2 to energize solenoid 28 to move valve 17 to the dispensing position to permit fluid in tank 24 to flow, by gravity, into reservoir 2. The cam actuator holds the contacts closed to retain solenoid 28 energized for a time sufficient to permit tank 24 to be completely drained. Upon further movement of meter 10, the contacts are opened and solenoid 28 is de-energized, thereby moving valve 17 to the filling position to permit the fluid to flow from supply tank 11 through valve 17 to again completely fill metering tank 24.

Valve 17 will remain in the filling position, with the metering tank filled, until the predetermined quantity of fresh water, as measured by meter 10, is again dispensed through ball float valve 7 and the electrical contacts will again be closed to energize solenoid 28 and move valve element 25 to the dispensing position. Thus, it is seen that each time the predetermined quantity of fresh water is added to reservoir 2, an accurately measured quantity of the chemical treating fluid is dispensed from metering tank 24. Since metering tank 24 is completely filled and completely emptied upon each cycle of operation of the system, it is not necessary to rely upon any variable weirs, orifices, or other flow-rate measuring devices to control the relatively small quantity of treating fluid dispensed.

While the present invention has been described and illustrated as employed to dispense a single chemical treating fluid, it is believed apparent that any number of fluids could be dispensed, each in a quantity proportional to the quantity of makeup water added to the system. Further, the several fluids could be dispensed simultaneously by employing the same set of electrical contacts to energize a number of solenoid actuated valves or, alternatively, the fluids could be dispensed individually by providing a plurality of electrical contacts in the meter 10 with each set of contacts connected to and controlling a separate solenoid actuated valve. Further, by connecting the metering tank dischage pipe (18) directly to the suction side of the circulating pump, the dispensing apparatus can be employed in a pressurized system such as employed in a boiler. This arrangement also permits the reservoir 11 and metering tank to be positioned at a level below the level of the water in the reservoir 3.

It is also believed apparent that the invetnion is not restricted to use with captive cooling water system but would be generally applicable in apparatus for accurately adding or mixing fluids. For example, the invention may be employed in apparatus for adding chemicals in water or sewage treatment systems, or in apparatus for combining a plurality of fluids in series, in proportional quantities, to make a product composed of the plurality of different fluids, each of which has been accurately measured as added. Accordingly, while I have described a prefererd embodiment of my invention, I wish it understood that I do not intend to be restricted solely thereto, but that I do intend to cover all embodiments thereof which would be apparent to one skilled in the art and which come within the spirit and scope of my invention.

I claim:

1. A fluid handling system for dispensing proportional quantities of a plurality of fluids, comprising, in combination, a first fluid conduit connected to a supply of a first fluid for delivering and dispensing said first fluid, a reservoir for containing a supply of a second fluid to be dispensed, said reservoir having an outlet therein in position to permit fluid to flow therefrom by gravity, a constant volume metering tank positioned below the level of said outlet and having an opening in the bottom wall thereof, float valve means mounted on said tank for permitting the flow of fluid into and out of said metering tank while preventing the flow of air therefrom through said opening in said bottom wall, means including an opening in the top wall of said tank for venting the interior thereof to atmosphere, second conduit means connecting said outlet and said opening, valve means in said second conduit, said valve means being movable between a filling position establishing fluid communication between said reservoir and said metering tank to permit fluid to flow by gravity from said reservoir to fill said metering tank and a dispensing position interrupting said fluid communication and permitting the fluid in said metering tank to be dispensed therefrom, meter means for measuring the quantity of fluid dispensed from said first conduit, and valve actuating means operatively connected to said meter means for moving said valve between said filling and said dispensing positions to successively fill and empty said metering tank in response to a predetermined quantity of fluid being dispensed from said first conduit, said valve actuating means including motor means normally retaining said valve in said filling position and operable to move said valve to said dispensing position, and said meter means including means controlling operation of said motor means to move said valve between said filling and dispensing positions.

2. The fluid handling system defined in claim 1 further comprising valve means controlling the flow of fluid from said first conduit.

3. The fluid handling system defined in claim 1 wherein said motor means includes a solenoid, said solenoid being normally deenergized and resiliently biased in a direction to retain said valve in said filling position and operable when energized to move said valve to said dispensing position, and said motor control means including means operable to energize said solenoid each time a predetermined quantity of fluid is dispensed from said first conduit.

4. The fluid handling system defined in claim 1 wherein said float valve comprises a valve body supported on said bottom wall and having a passage extending therethrough in communication with said opening in said bottom wall, an annular valve seat in said passage, a spherical float within said tank, and guide means within said tank for guiding said float into engagement with said seat.

5. The fluid handling system defined in claim 4 wherein said guide means includes a hollow generally cylindrical member extending between the openings in said top and bottom walls and having an inside diameter sufficient to permit said float to move therethrough, and a plurality of openings extending through the wall of said guide and spaced therealong.

6. The fluid handling system defined in claim 1 wherein the fluid in said metering tank is permitted to flow therefrom by gravity when said valve is in said dispensing position.

References Cited

UNITED STATES PATENTS

| 1,790,480 | 1/1931 | Macomber | 137—429 |
| 2,565,045 | 8/1951 | Ray | 222—442 |
| 2,801,646 | 8/1957 | Funderwhite | 137—625.46 |
| 3,282,277 | 11/1966 | Hayman | 137—3 |

FOREIGN PATENTS 627,701   8/1949   Great Britain.

CLARENCE R. GORDON, *Primary Examiner.*

HOWARD M. COHN, *Assistant Examiner.*

U.S. Cl. X.R.

137—31, 101, 429; 222—57, 442